United States Patent
Park et al.

(10) Patent No.: US 8,231,490 B2
(45) Date of Patent: Jul. 31, 2012

(54) POWER TRAIN OF HYBRID VEHICLE

(75) Inventors: Jongsool Park, Gyeonggi-do (KR); Changwook Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 378 days.

(21) Appl. No.: 12/274,734

(22) Filed: Nov. 20, 2008

(65) Prior Publication Data

US 2009/0312129 A1 Dec. 17, 2009

(30) Foreign Application Priority Data

Jun. 12, 2008 (KR) .................. 10-2008-0055112

(51) Int. Cl.
 *F16H 3/72* (2006.01)
 *F16H 37/06* (2006.01)
 *B60K 6/20* (2007.10)

(52) U.S. Cl. ........................ 475/5; 180/65.21

(58) Field of Classification Search ............ 475/5, 282, 475/296, 330; 180/65.21, 65.225, 65.24, 180/65.26, 65.6, 65.7
See application file for complete search history.

(56) References Cited

U.S. PATENT DOCUMENTS

| | | | | |
|---|---|---|---|---|
| 7,192,373 B2 * | 3/2007 | Bucknor et al. | ........... | 475/5 |
| 7,220,201 B2 * | 5/2007 | Raghavan et al. | ........... | 475/5 |
| 7,232,393 B2 * | 6/2007 | Bucknor et al. | ........... | 475/5 |
| 7,252,611 B2 * | 8/2007 | Raghavan et al. | ........... | 475/5 |
| 7,261,659 B2 * | 8/2007 | Raghavan et al. | ........... | 475/5 |
| 7,276,007 B2 * | 10/2007 | Takami et al. | ........... | 475/5 |
| 7,422,535 B2 * | 9/2008 | Raghavan et al. | ........... | 475/5 |
| 7,473,199 B2 * | 1/2009 | Bucknor et al. | ........... | 475/5 |

FOREIGN PATENT DOCUMENTS

| | | |
|---|---|---|
| JP | 2000-326739 | 11/2000 |
| JP | 2006-077859 A | 3/2006 |
| JP | 2006-282069 A | 10/2006 |
| JP | 2006-288122 | 10/2006 |
| JP | 2006-341647 | 12/2006 |
| JP | 2006-347268 | 12/2006 |
| JP | 2008-114811 A | 5/2008 |

* cited by examiner

*Primary Examiner* — David D Le
*Assistant Examiner* — Michael Gonzalez
(74) *Attorney, Agent, or Firm* — Edwards Wildman Palmer LLP; Peter F. Corless (57) ABSTRACT

A power train according to an embodiment of the invention includes two sets of planetary gear set, one clutch, and two brakes and provides one electric vehicle mode, two hybrid modes, and one engine mode The power train has a simple configuration, high power performance, and reduced weight and fuel consumption. In particular, the power train makes it possible to reduce a significant amount of fuel consumption especially when a vehicle is traveling at a constant high-velocity.

2 Claims, 9 Drawing Sheets

POWER TRAIN OF HYBRID VEHICLE

CROSS-REFERENCE TO RELATED APPLICATIONS

The present application is based on, and claims priority from, Korean Application Serial Number 10-2008-0055112, filed on Jun. 12, 2008, the disclosure of which is hereby incorporated by reference herein in its entirety.

TECHNICAL FIELD

The present invention relates to a power train of a hybrid vehicle, particularly a power train of a hybrid vehicle that uses an internal combustion engine and a motor generator driven by electricity as a power source providing a driving force to driving wheels.

BACKGROUND ART

Hybrid vehicles using an engine and a motor generator reduce the fuel consumption on the basis of a technology that uses, as a driving force, power from a motor generator having relatively good low-velocity torque characteristics at a low velocity and uses power from an engine having relatively good high-velocity torque characteristics at a high velocity. Further, as the hybrid vehicles do not generate exhaust gas while being driven by only the motor generator, it is environment-friendly. Techniques for reducing fuel consumption with a simpler configuration have been proposed.

The above information disclosed in this Background ART section is only for enhancement of understanding of the background of the invention and therefore it may contain information that does not form the prior art that is already known in this country to a person of ordinary skill in the art.

SUMMARY

Embodiments of the present invention provide a power train of a hybrid vehicle having simple configuration, high power performance, and reduced weight and fuel consumption, while being easily equipped in the vehicle.

A power train of a hybrid vehicle according to the invention includes a first planetary gear set, a second planetary gear set, a first brake, a second brake, and a clutch. The first planetary gear includes three elements where a first motor generator and an output shaft are separately connected. The second planetary gear includes three elements where an engine, a second motor generator, and the output shaft are separately connected. The first brake is provided to fix the element of the first planetary gear set other than the elements connected with the first motor generator and the output shaft. The second brake is provided to fix the element of the second planetary gear set connected with the second motor generator. The clutch is rotatably engaged with the element of the first planetary gear set connected with the first brake and the element of the second planetary gear set connected with the second brake.

The first planetary gear set is a single-pinion type planetary gear set including a first sun gear connected with the first motor generator, a first carrier connected with the output shaft, and a first ring gear connected with the first brake. The second planetary gear set is a single-pinion type planetary gear set including a second sun gear connected with the second motor generator, a second carrier connected with the engine, and a second ring gear connected with the output shaft.

The first planetary gear set and the second planetary gear set are coaxially arranged in parallel, the first motor generator is connected with the first planetary gear set, the output shaft is connected with the second ring gear through the first carrier, the engine is connected with the second carrier through between the first planetary gear set and the second planetary gear set, and the second motor generator is connected with the second planetary gear set.

The first planetary gear set, in a lever analysis diagram, is arranged on a first straight line in the order of an element connected with the first motor generator, an element connected with the output shaft, and an element connected with the second planetary gear set through the clutch. Further, the second planetary gear set, in the lever analysis, is arranged on a second straight line, which crosses the first straight line at at least one point, in the order of an element connected with the first planetary gear set through the clutch, an element connected with the engine, and an element connected with the output shaft, in which as the clutch is engaged, the first straight line and the second straight line make a single straight line.

The power train of a hybrid vehicle according to the invention has a simple configuration, high power performance, and reduced weight and fuel consumption, while being easily equipped in the vehicle. In particular, a significant amount of fuel consumption can be reduced when a vehicle is traveling at a high speed for a long time.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

For better understanding of the nature and objects of the present invention, reference should be made to the following detailed description with the accompanying drawings, in which.

DETAILED DESCRIPTION

Embodiments of the invention are described hereafter in detail with reference to the accompanying drawings, but theses embodiments are just examples and can be achieved in various modifications by those skilled in the art. Therefore, the present invention is not limited to the embodiments.

Figure 1:
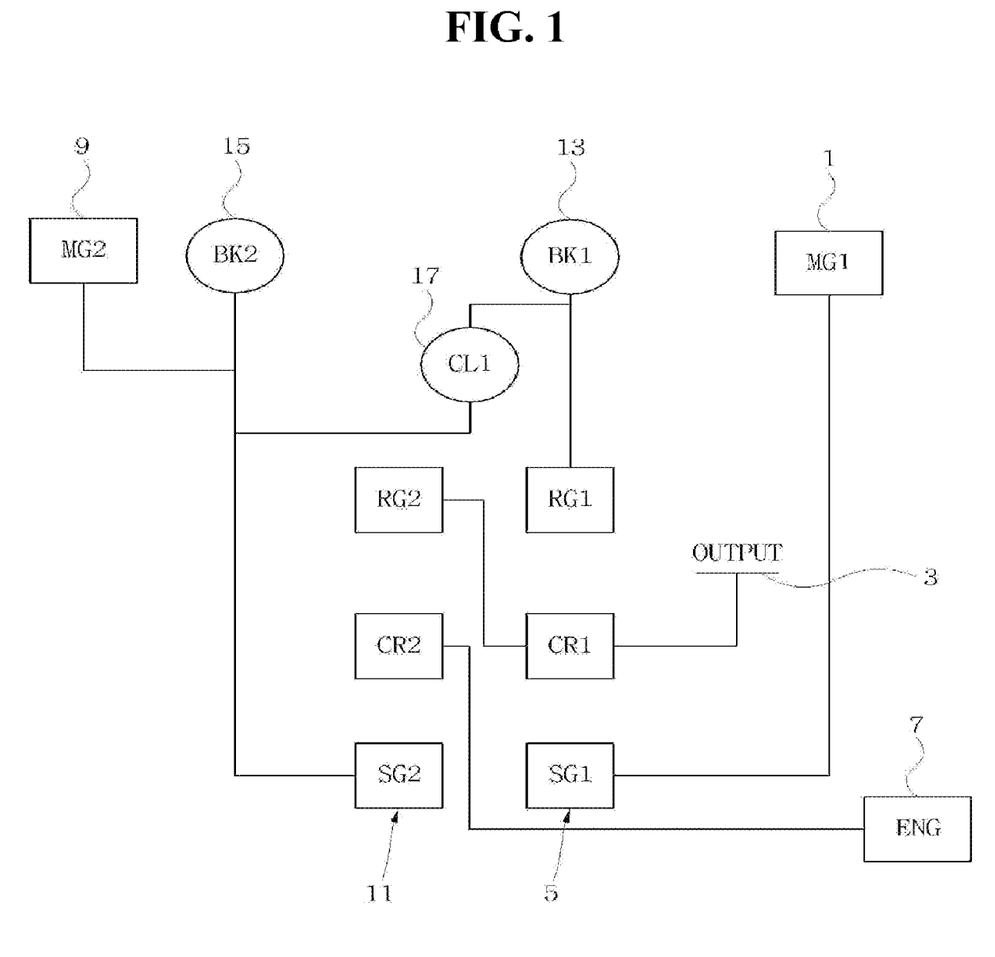
FIG. 1 is a view illustrating an example of the configuration of a power train of a hybrid vehicle according to the invention.

Referring to FIG. 1, a power train of a hybrid vehicle according to an embodiment of the invention includes: a first planetary gear set 5 including three elements where a first motor generator 1 and an output shaft 3 are separately connected; a second planetary gear set 11 including three elements where an engine 7, a second motor generator 9, and output shaft 3 are separately connected; a first brake 13 that is provided to fix the element of first planetary gear set 5 other than the elements connected with the first motor generator 1 and the output shaft 3; a second brake 15 that is provided to fix the element of the second planetary gear set 11 connected with the second motor generator 9; and a clutch 17 that can be rotatably engaged with the element of the first planetary gear set 5 connected with the first brake 13 and the element of the second planetary gear set 11 connected with the second brake 15.

That is, the power train includes the two planetary gear sets 5, 11, one clutch 17, and two brakes 13, 15 such that it can transmit/receive power to/from the two motor generators 1, 9, and receive power from the engine 7 and outputs shifted power through the output shaft 3.

In this embodiment, the first planetary gear set 5 is a single-pinion type planetary gear set, in which a first sun gear is connected with the first motor generator 1, a first carrier is connected with output shaft 3, and a first ring gear is connected with the first brake 13.

The second planetary gear set 11 is also a single-pinion type planetary gear set, in which a second sun gear is connected with the second motor generator 9, a second carrier is connected with the engine 7, and a second ring gear is connected with the output shaft 3.

The first planetary gear set 5 and the second planetary gear set 11 are coaxially arranged in parallel, the first motor generator 1 is connected with the first planetary gear set 5, the output shaft 3 is connected with the second ring gear through the first carrier, the engine 7 is connected with the second carrier through between the first planetary gear set 5 and the second planetary gear set 11, and the second motor generator 9 is connected with the second planetary gear set 11.

That is, the first carrier is directly connected with the second ring gear and also rotatably connected with output shaft 3. Further, the first brake 13 and the clutch 17 are connected with the first ring gear and the second brake 15 and the clutch 17 are connected with the second sun gear. Accordingly, when the clutch 17 is not engaged, the first ring gear and the second sun gear are fixed by the operations of the first brake 13 and the second brake 15, respectively. On the other hand, when the clutch 17 is engaged, as either the first brake 13 or the second brake 15 operates, both of the first ring gear and the second sun gear are fixed.

Further, the second motor generator 9 is directly connected with the second sun gear, such that the second motor generator 9 is fixed with the second sun gear by the operation of second brake 15, and operates with the first ring gear when the clutch 17 is actuated.

As shown in the lever analysis diagrams of FIGS. 3, 5, 7, and 9, the first planetary gear set 5 is arranged on a first straight line 19 in the order of an element connected with the first motor generator 1, an element connected with the output shaft 3, and an element connected with the second planetary gear set 11 through the clutch 17.

The second planetary gear set 11 is arranged on a second straight line 21, which crosses the first straight line 19 at one or more points, in the order of an element connected with the first planetary gear set 5 through the clutch 17, an element connected with the engine 7, and an element connected with the output shaft 3 through the first planetary gear set 11, in which as the clutch 17 is engaged, the first straight line 19 and the second straight line 21 make a single straight line.

That is, the first sun gear, the first carrier, and the first ring gear are sequentially arranged on first straight line 19, and the second sun gear, the second carrier, and the second ring gear are sequentially arranged on second straight line 21. Accordingly, an end of the second straight line 21 always crosses the first straight line 19 at the point where the second ring gear is connected with output shaft 3 together with the first carrier.

When the clutch 17 is engaged, the second straight line 21 overlaps the first straight line 19 such that the second sun gear and the first ring gear make a point, resulting that the second carrier connected with the engine 7 on the second straight line 21 is positioned between the first ring gear and the first carrier on the first straight line 19.

The operation in each mode of the power train of a hybrid vehicle according to an embodiment of the invention is described hereafter with reference to the lever analysis diagrams of FIGS. 3, 5, 7, and 9, which shows arrangement of the elements of the planetary gear sets and relative gear ratios of the elements as well.

Figure 2:
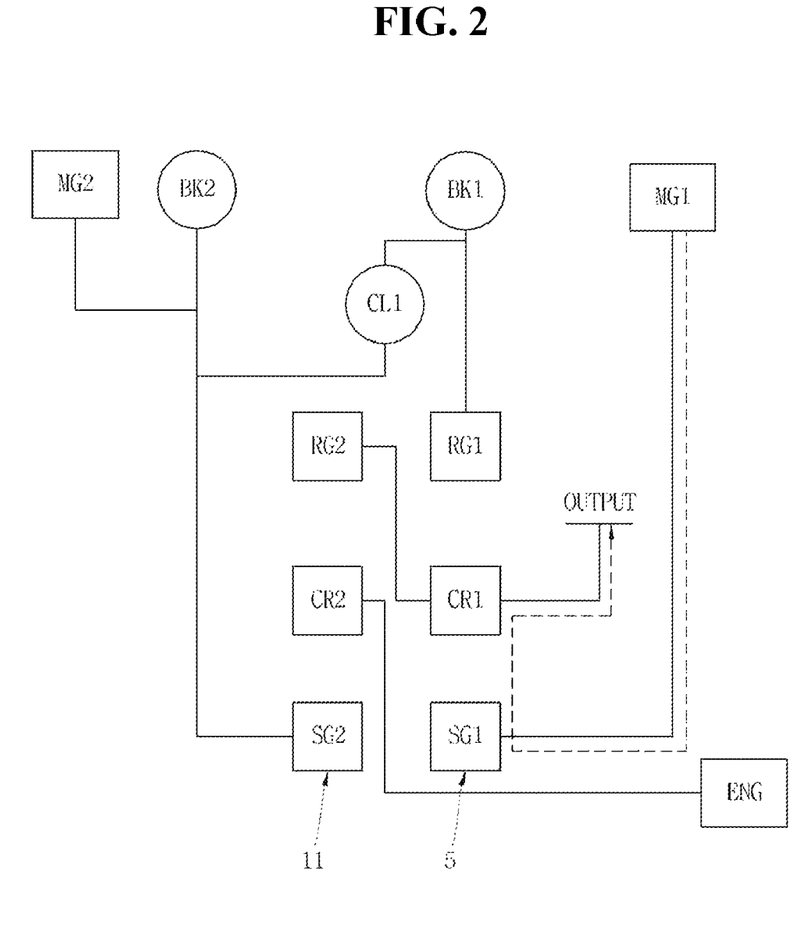
FIG. 2 shows a power flow diagram illustrating that the power train of FIG. 1 achieves an electric vehicle mode.
Figure 3:
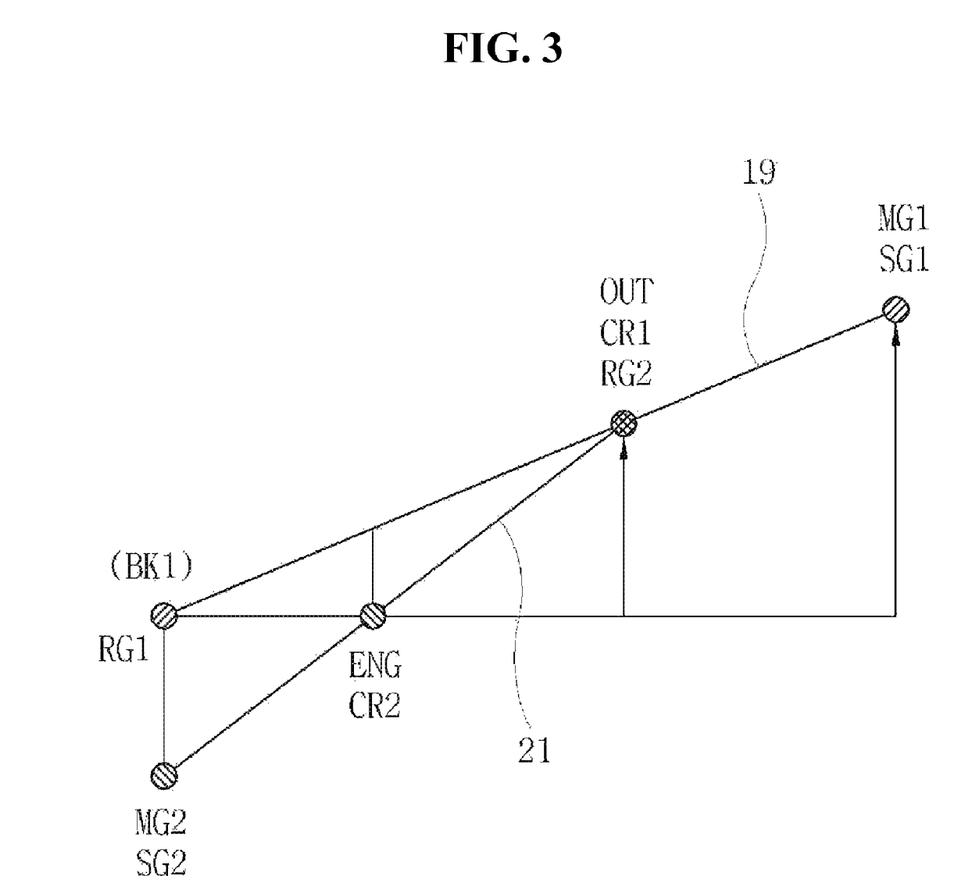
FIG. 3 shows a lever analysis diagram illustrating that the power train of FIG. 1 achieves an electric vehicle mode.

FIGS. 2 and 3 illustrate an electric vehicle mode in which the vehicle is driven by at least one motor generator without operating an engine.

In this mode, the first brake 13 is engaged while the clutch 17 and the second brake 15 are disengaged. Torque generated by the first motor generator 1 is supplied through the first sun gear, reduced according to a gear ratio of the first planetary gear set 5, and then outputted to the output shaft 3 through the first carrier.

For illustration purposes, the rotational direction of the output shaft 3 is defined as a normal direction and the opposite direction is defined as an inverse direction hereafter.

Because the engine 7 is stopped, the second motor generator 9 connected with the second sun gear is rotated in the inverse direction without torque.

Figure 4:
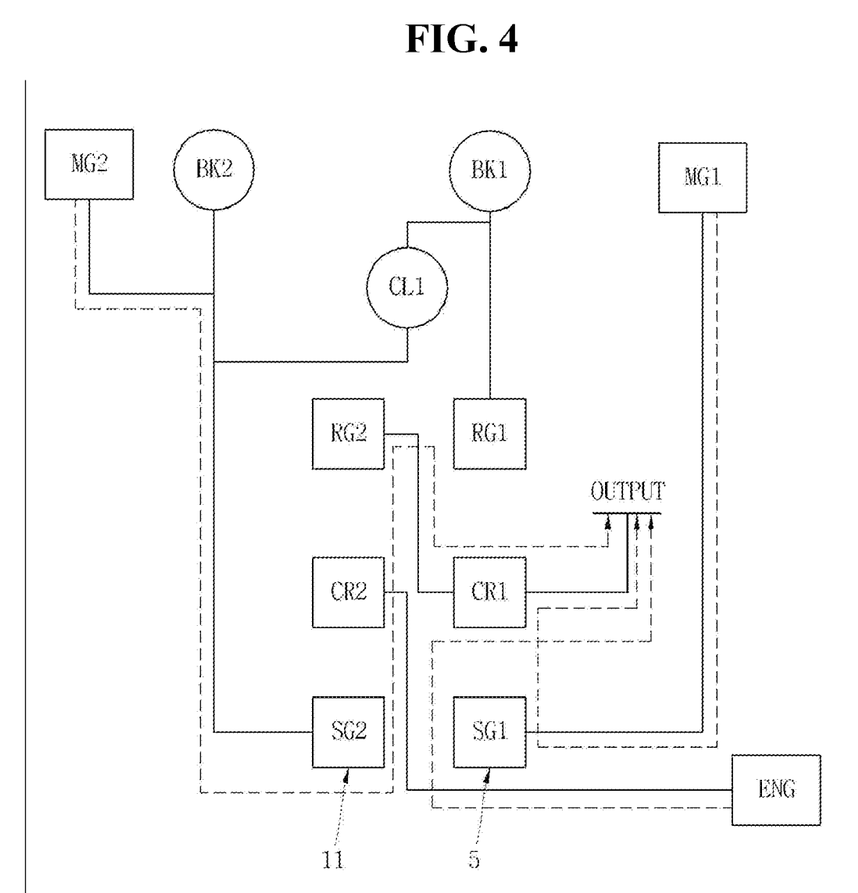
FIG. 4 shows a power flow diagram illustrating that the power train of FIG. 1 achieves a first hybrid mode.
Figure 5:
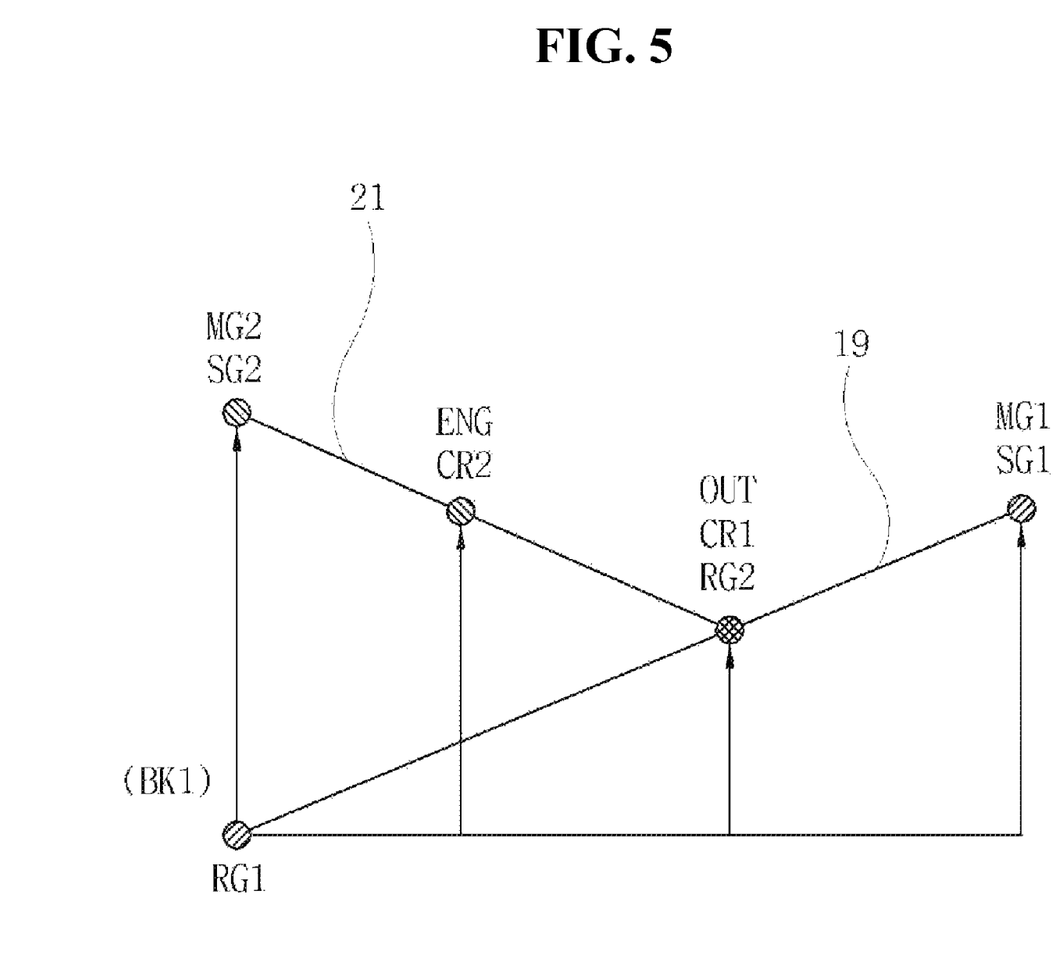
FIG. 5 shows a lever analysis diagram illustrating that the power train of FIG. 1 achieves a first hybrid mode.

As the second motor generator 9 that has rotated in the inverse direction in the electric vehicle mode is rotated in the normal direction as shown in FIGS. 4 and 5, the engine 7 increases in rotational velocity, can be started and generate torque and thus power supplied from the first motor generator 11 and power supplied from the engine 7 are simultaneously outputted to the output shaft 5, thereby achieving a first hybrid mode.

In the first hybrid mode, the first brake 13 is engaged while the second brake 15 and the clutch 17 are disengaged.

In the above operation, the second motor generator 9 functions as a generator that provides a reaction force according to the torque of the engine 7, thereby substantially controlling the shift ratio.

The first motor generator 1 cannot control the shift ratio because the first ring gear is fixed by the first brake 13, such that it only functions as a motor that transmits torque to the output shaft 3 through the first carrier.

Figure 6:
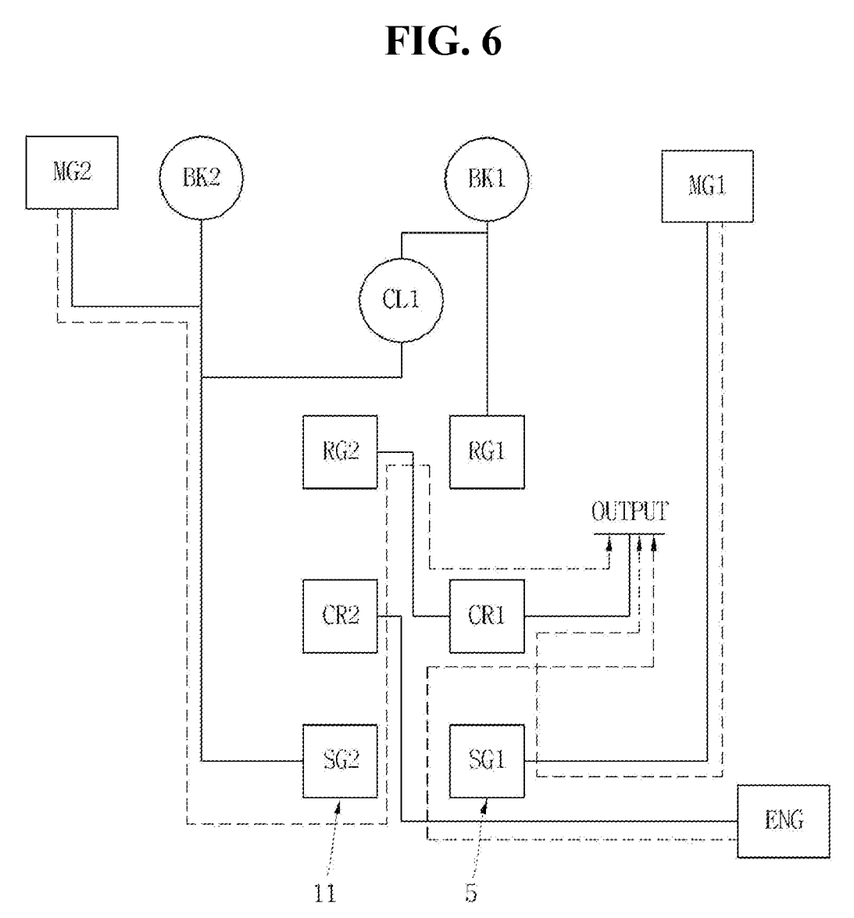
FIG. 6 shows a power flow diagram illustrating that the power train of FIG. 1 achieves a second hybrid mode.
Figure 7:
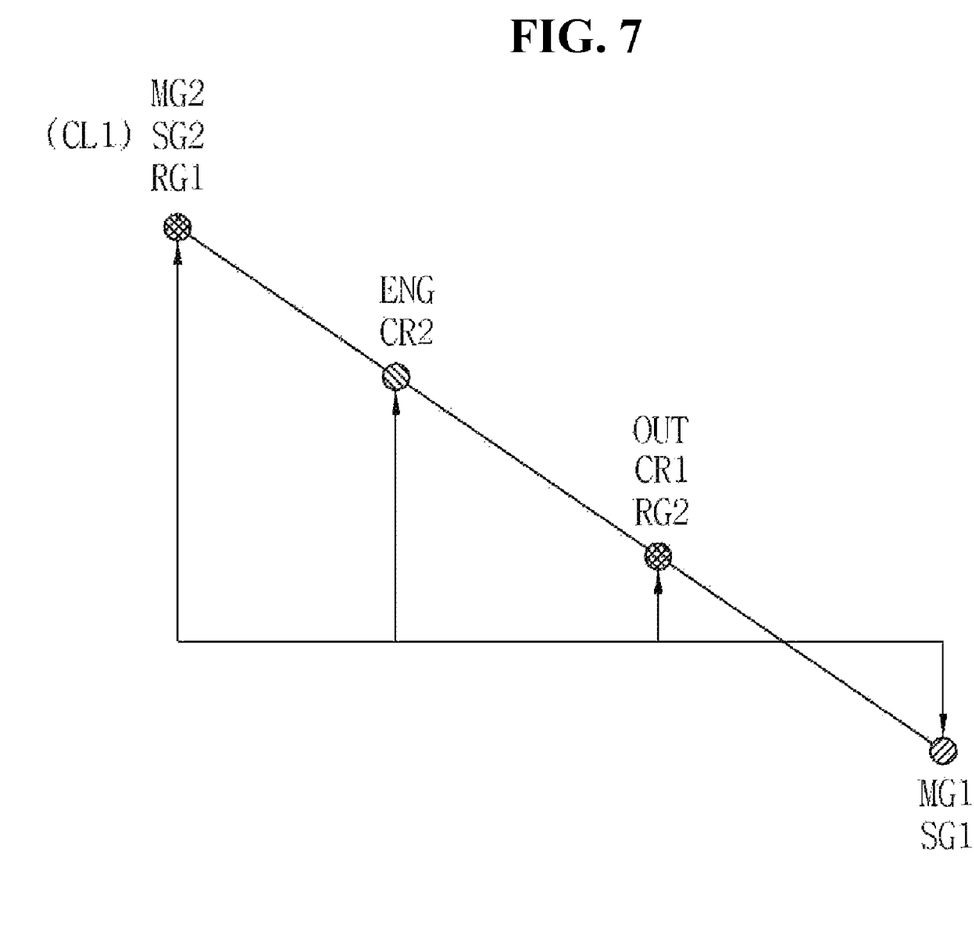
FIG. 7 shows a lever analysis diagram illustrating that the power train of FIG. 1 achieves a second hybrid mode.

FIGS. 6 and 7 illustrate a second hybrid mode that is different from the first hybrid mode, in which the first hybrid mode is changed to the second hybrid mode by engaging the clutch 17 and disengaging the first brake 13 after controlling the shift ratio such that the velocity of the second sun gear reaches 0.

As the clutch 17 is disengaged as described above, both the first planetary gear set 5 and the second planetary gear set 11 make a lever on a single straight line in the lever analysis diagram.

Here, the first motor generator 1 functions as a motor, rotating in the inverse direction, and the second motor generator 9 functions as a generator, thereby achieving the second hybrid mode different from the first hybrid mode.

Figure 8:
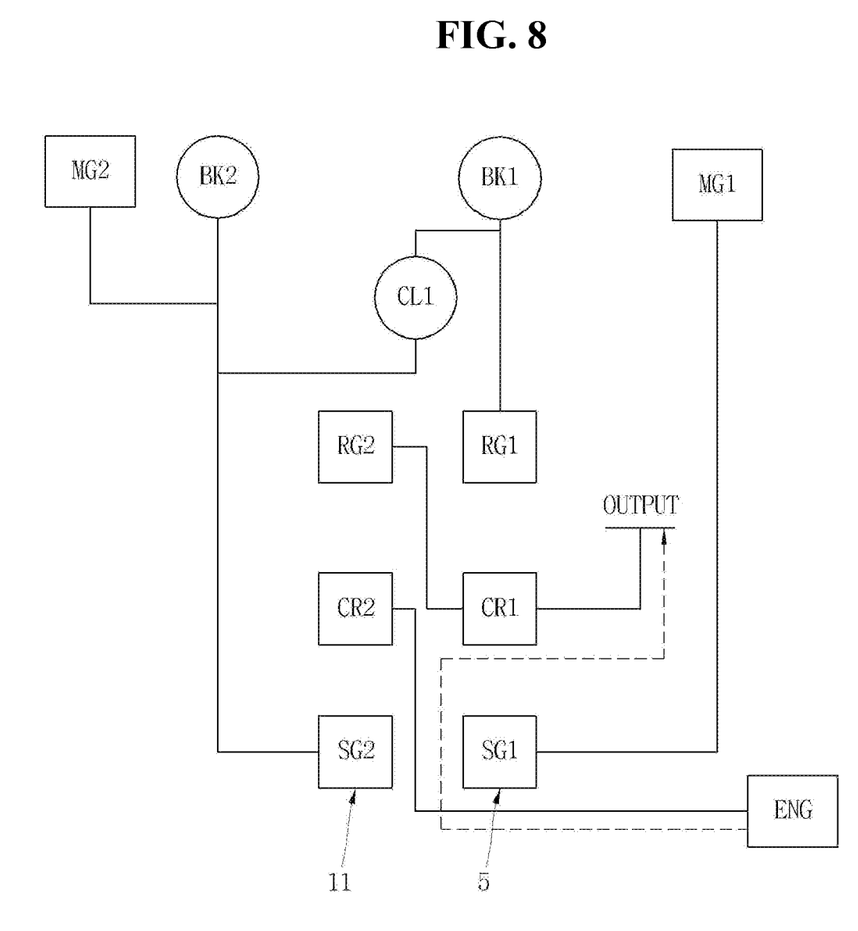
FIG. 8 shows a power flow diagram illustrating that the power train of FIG. 1 achieves an engine mode.
Figure 9:
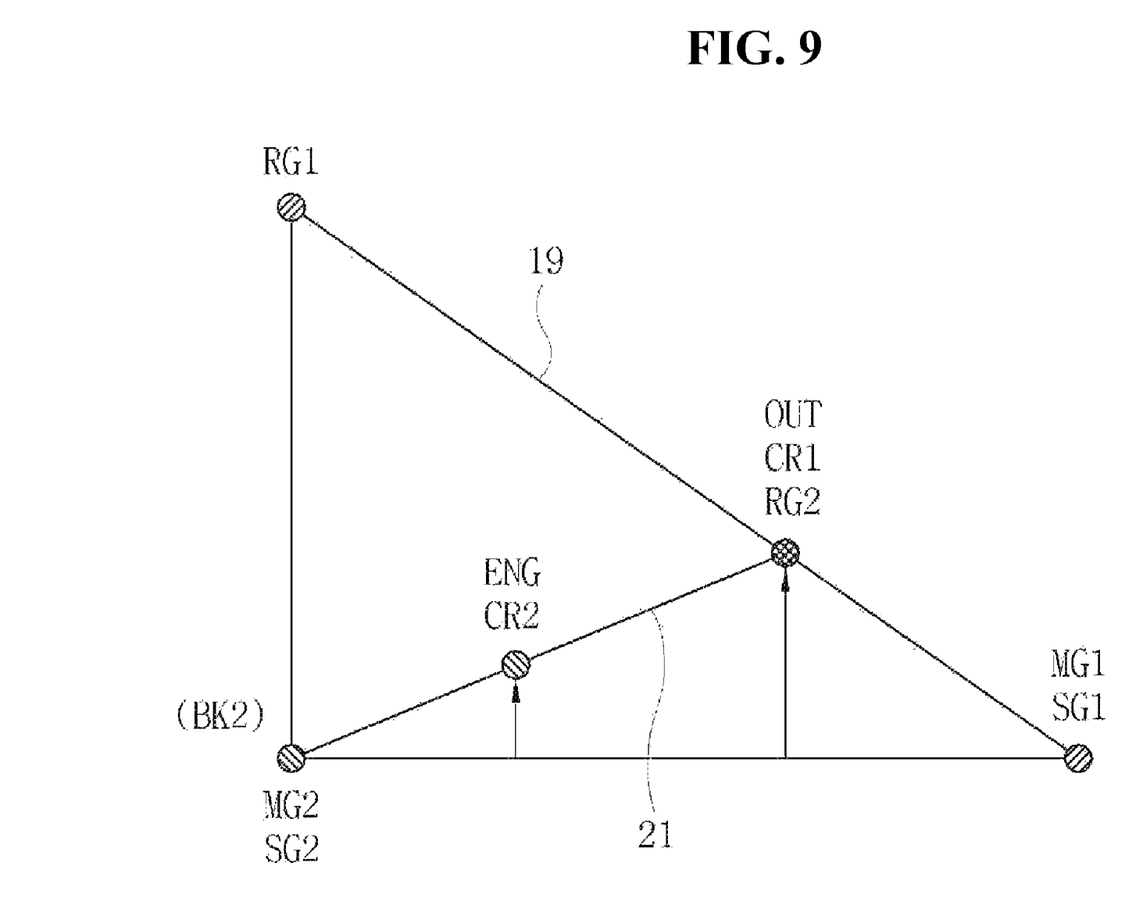
FIG. 9 shows a lever analysis diagram illustrating that the power train of FIG. 1 achieves an engine mode.

FIGS. 8 and 9 show a engine mode that can be provided by the power train of the invention, in which the first motor generator 1 is stopped.

After the velocities of the first ring gear and second sun gear reach 0 by controlling the shift ratio in the second hybrid mode, when the torque of the first motor generator 1 and the second motor generator 9 is removed by engaging the second brake 15 and disengaging the clutch 17, torque is applied only in the second planetary gear set, thereby achieving the engine mode in which the vehicle is driven substantially by the torque of the engine 7.

That is, referring to the lever analysis diagram of FIG. 9, the first motor generator 1 is fixed and the second motor generator 9 is also fixed by the second brake 15. Accordingly, the first motor generator 1 and the second motor generator 9 are substantially stopped, such that a mechanical point with the highest efficiency is achieved without energy loss due to changes between mechanical energy and electric energy.

Since the rotational velocity of the output shaft 3 is larger than the rotational velocity supplied from the engine 7 to the second carrier, an overdrive shift ratio is formed, which makes it possible to reduce a significant amount of fuel consumption especially when a vehicle is traveling at a high speed for a long time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power train of a hybrid vehicle, comprising:
a first single-pinion type planetary gear set including a first sun gear, a first carrier, and a first ring gear, the first sun gear connected to a first motor generator and the first carrier directly connected to an output shaft;
a second planetary gear set including a second sun gear, a second carrier, and a second ring gear, the second sun gear directly connected to a second motor generator, the second carrier directly connected to an engine, and the second ring gear directly connected to the first carrier;
a first brake configured to fix the first ring gear;
a second brake configured to fix the second sun gear; and
a clutch configured to be rotatably engaged directly with the first ring gear and the second sun gear,
wherein the first planetary gear set and the second planetary gear set are coaxially arranged in parallel, the output shaft is connected with the second ring gear through the first carrier, and the engine is connected with the second carrier through a space between the first planetary gear set and the second planetary gear set.

2. A power train of a hybrid vehicle, comprising:
a first single-pinion type planetary gear set including a first sun gear, a first carrier, and a first ring gear, the first sun gear connected to a first motor generator and the first carrier directly connected to an output shaft;
a second planetary gear set including a second sun gear, a second carrier, and a second ring gear, the second sun gear directly connected to a second motor generator, the second carrier directly connected to an engine, and the second ring gear directly connected to the first carrier;
a first brake configured to fix the first ring gear;
a second brake configured to fix the second sun gear; and
a clutch configured to be rotatably engaged directly with the first ring gear and the second sun gear.

* * * * *